United States Patent
Lavoie

(10) Patent No.: US 6,850,687 B2
(45) Date of Patent: Feb. 1, 2005

(54) OPTICAL FIBER RETAINING CLIP

(75) Inventor: Hervé Lavoie, Montreal (CA)

(73) Assignee: ITF Technologies Optiques Inc., Montreal (CA)

( * ) Notice: Subject to any disclaimer, the term of this patent is extended or adjusted under 35 U.S.C. 154(b) by 133 days.

(21) Appl. No.: 10/395,604

(22) Filed: Mar. 25, 2003

(65) Prior Publication Data

US 2004/0052493 A1 Mar. 18, 2004

(30) Foreign Application Priority Data

Sep. 16, 2002 (CA) .............................................. 2403597

(51) Int. Cl.[7] .............................................. G02B 6/00
(52) U.S. Cl. ........................ 385/137; 385/135; 385/136
(58) Field of Search ................................ 385/134–139; 361/760; 174/191

(56) References Cited

U.S. PATENT DOCUMENTS

| | | | | |
|---|---|---|---|---|
| 293,205 A | 2/1884 | Wiard | ........................ | 254/211 |
| 329,588 A | 11/1885 | Nordin | ........................ | 12/109 |
| 366,606 A | 7/1887 | Pope et al. | .................. | 439/675 |
| 428,330 A | 5/1890 | Burroughs | .................... | 280/77 |
| 6,718,112 B1 * | 4/2004 | Rodriguez et al. | .......... | 385/137 |
| 6,724,637 B2 * | 4/2004 | Li et al. | ...................... | 361/760 |

* cited by examiner

Primary Examiner—Phan T. H. Palmer
(74) Attorney, Agent, or Firm—George J. Primak; Louis Tessier

(57) ABSTRACT

A retaining clip for retaining a strip of optical fiber. The clip includes a mounting base for mounting the clip to a mounting surface. A first spacing leg and a second spacing leg are both attached about their respective first ends to the mounting base. A first retaining leg and a second retaining leg are attached to the first and second spacing legs adjacent their respective second ends. The first and second retaining legs respectively defining a first and a second overlapping segment respectively extending generally inwardly beyond the second and first retaining leg second ends. The first and second overlapping segments are in a generally parallel and spaced relationship relative to each other so as to define an insertion slot therebetween. The insertion slot defining an insertion slot longitudinal axis extending in a generally parallel relationship relative to the spacing between the spacing leg first ends. The clip is configured and sized so as to allow insertion of the strip of optical fiber in the insertion slot while respecting the minimum bend radius of the fiber and so as to reduce the risks of having the strip of fiber slip out of the clip.

20 Claims, 3 Drawing Sheets

OPTICAL FIBER RETAINING CLIP

FIELD OF THE INVENTION

The present invention relates to the general field of optical fiber management accessories and is particularly concerned with an optical fiber retaining clip.

BACKGROUND OF THE INVENTION

In recent years, fiber optic cables have replaced traditional copper wire as the preferred medium for telecommunications. As with traditional wires, it is often necessary to secure strips of optical fiber in specific configurations or position strips of optical fiber in predetermined relationships relative to mounting or supporting surfaces. For example, as with copper wires, it is often necessary to provide interconnections and cross-connections between optical fibers at various locations in the distribution system.

The prior art is replete with fiber optic junction boxes, organizers or the like designed for this purpose. Several of these structures utilize fiber-organizing trays that slide out of a housing or cabinet-like drawer. In some units, the trays are pivotally attached to the housing.

Common features of a conventional fiber-organizing tray include a spool or reel for storing excess fiber slack and maintaining a minimum bend radius in the fiber to prevent undue stress or kinks. Conventional fiber organizing trays typically also include a splice area having retaining clips, adhesives or other means for attaching splice elements to the trays and tabs or lugs which keeps the fibers from slipping off the reel or out of the tray. A cover is often provided for protecting selected portions of the fibers.

While the prior art trays are useful in providing a structure that allows for organizing of the optical fiber strips at various locations in the distribution system, they nevertheless suffer from numerous major drawbacks. Some of these drawbacks are related to the retaining clips and the tabs or lugs that are used for keeping the strips of optical fiber in proper alignment and, in particular, that are used for preventing the strips of optical fiber from slipping off the reels or out of the trays.

One of the common drawbacks associated with conventional fiber tray retaining structures is that the tabs or lugs, sometimes because of manufacturing considerations, are often mounted relatively close to a side or front wall of the tray. Portions of the optical fiber adjacent the walls of the tray therefore often undergo bending beyond their minimum bend radius. As is well known in the art, bending of a strip of optical fiber beyond the minimum bend radius of the fiber potentially induces optical losses in the fibers and/or promotes fractures in the latter.

In order to circumvent the disadvantages associated with tabs or lugs located close to the walls of the tray, fiber-retaining clips positionable away from the walls are sometimes used. However, most prior art fiber optic retaining clips also suffer from major disadvantages. The design of some prior fiber optic retaining clips seems to be derived without suitable adaptation from the design of prior art clips typically associated with copper wires or cords such as the retaining clips disclosed in the following documents:

U.S. Des. Pat. No. 329,588 naming Richard E. MICHEL Jr. as inventor and issued Sep. 22, 1992;

U.S. Des. Pat. No. 293,205 naming Yoshihito NAKANO as inventor and issued Dec. 15, 1987;

U.S. Des. Pat. No. 428,330 naming Dare T. JOHNSTON et al as inventors and issued Jul. 18, 2000; and U.S. Des. Pat. No. 366,606 naming Toshinobu NAKAMURA as inventor and issued Jan. 13, 1996.

Most of the prior art retaining clips disclosed in the above-cited documents require that the fiber be twisted, bent or otherwise forced into the retaining structure formed by the clip thus creating undue localized stresses in the fiber. These undue stresses, in turn, potentially cause a loss of optical and mechanical properties.

Other clip designs such as that exemplified by U.S. Des. Pat. No. 329,588, allow for insertion of the optical fiber into the retaining structure without creating undue stresses on the fiber but suffer from the fact that the fiber may easily be unwantingly removed from the retaining structure formed by the clip through its insertion slot.

The risks of having the strips of optical fiber unwantingly slide out of the retaining structures through their insertion slot is compounded by the fact that optical fibers have an inherent resiliency which tends to bias the fibers towards a generally rectilinear configuration. Hence, when a bundle of optical fiber is retained in a clip such as that exemplified by U.S. Des. Pat. No. 329,588, the inherent resiliency of the fiber greatly increases the risks of having at least one of the fiber strips slip out of the insertion slot.

Yet another drawback associated with conventional fiber tray clips, tabs or lugs relates to the fact that these prior art retaining structures often present relatively sharp edges. During manipulation of the strips of fiber adjacent to these retaining structures or during storage of the strips of fiber in the trays, the strips of optical fiber that come into contact with the relatively sharp edges may be subjected to local pressures. The local pressures may, in turn, create local stresses again potentially altering the optical and/or mechanical properties of the fibers. Accordingly, there exists a need for an improved optical fiber retaining clip.

SUMMARY OF THE INVENTION

It is an object of the present invention to provide an improved optical fiber retaining clip. Advantages of the present invention include that the proposed retaining clip is specifically designed to secure strips or cable of optical fiber in specific configurations or in specific relationships relative to mounting or supporting surfaces.

The proposed retaining clip is designed so as to allow insertion of a strip of optical fiber into the retaining structure formed by the clip with reduced risks of creating undue stresses on the fiber. Also, the proposed retaining clip is designed so as to allow insertion of a strip of optical fiber into the retaining structure formed by the clip while respecting the minimum bend radius of the fiber. Furthermore, the proposed retaining clip allows for insertion and removal of a strip of optical fiber into and from the retaining structure formed by the clip through a set of ergonomical, easy and quick steps without requiring special tooling or manual dexterity.

Still further, the proposed retaining clip is designed so as to reduce the risks of having strips of optical fiber unwantingly slip out of the retaining structure formed by the clip. Also, the proposed retaining clip reduces the risk of creating localized stress on the fiber when the latter abuts against the edges of the clip.

Furthermore, the proposed retaining clip optionally allows for mounting and removal of the clip structure to and from amounting surface through a set of ergonomical steps again without requiring special tooling or manual dexterity and without the risk of damaging the mounting structure or the clip structure itself.

Still further, the proposed retaining clip is designed so as to be manufacturable through conventional forms of manufacturing and using a conventional material such as an injection moldable polymeric resin so as to provide a retaining clip that will be economically feasible, long lasting and relatively trouble-free in operation.

In accordance with an embodiment of the present invention, there is provided a retaining clip for retaining a strip of optical fiber, said strip of optical fiber defining a minimum bend radius, the clip being mountable on a mounting surface, the clip comprising: a mounting means for mounting the clip to the mounting surface; a first spacing leg and a second spacing leg, the first spacing leg defining a first spacing leg first end attached to the mounting means and an opposed first spacing leg second end, the second spacing leg defining a second spacing leg first end attached to the mounting means and an opposed second spacing leg second end; the first and second spacing legs both extending generally away from the mounting means, the first and second spacing leg first ends being spaced relationship relative to each other along a spacing leg spacing axis so as to define a spacing leg distance therebetween; a first retaining leg and a second retaining leg, the first retaining leg defining a first retaining leg first end attached to the first spacing leg and an opposed first retaining leg second end, the second retaining leg defining a second retaining leg first end attached to the second spacing leg and an opposed second retaining leg second end; the first and second retaining legs respectively defining a first and a second overlapping segment respectively extending generally inwardly beyond the second and first retaining leg second ends, the first and second overlapping segments being in a generally parallel and spaced relationship relative to each other so as to define an insertion slot therebetween, the insertion slot defining an insertion slot longitudinal axis extending in a generally parallel relationship relative to the spacing leg spacing axis.

Preferably, the first and second spacing legs extend from the mounting means respectively in a first spacing leg geometrical plane and in a second spacing leg geometrical plane, the first and second spacing leg geometrical planes being both adapted to be in a substantially perpendicular relationship relative to the mounting surface when the clip is mounted on the mounting surface.

Conveniently, the first and second spacing legs extend from the mounting means respectively along a first spacing leg axis and along a second spacing leg axis, the first and second spacing leg axes being both adapted to be in a substantially perpendicular relationship relative to the mounting surface when the clip is mounted on the mounting surface.

Preferably, the first and second retaining legs are configured, sized and positioned so that the insertion slot longitudinal axis intercepts both the first and second spacing leg axes.

Conveniently, the first and second retaining legs are positioned so as to be in a generally parallel relationship relative to the mounting surface when the clip is mounted on the mounting surface, the retaining legs being sized such that when the clip is mounted to the mounting surface. Preferably, the mounting means includes a base plate extending the first and second spacing legs respectively adjacent the first and second spacing leg first ends.

Conveniently, the base plate has a generally semi-oval transversal cross-sectional configuration defining a base plate first surface facing towards the first and second retaining legs and an opposed base plate second surface, the base plate first surface having a generally convex configuration and the base plate second surface having a generally flat configuration.

Preferably, the first and second retaining legs are both positioned in a generally parallel relationship relative to the base plate, the first and second spacing legs being sized so as to create a base-to-retaining leg spacing between the base plate first surface and the first and second retaining legs, the base-to-retaining leg spacing being sized so as to allow a segment of the strip of optical fiber to bend while respecting the minimum bend radius from a direction substantially perpendicular to the first and second retaining leg axes wherein it abuttingly contacts the base plate second surface to a direction substantially parallel to the first and second spacing leg axes wherein it is inserted in the insertion slot.

In one embodiment of the invention, the mounting means also includes an anchoring component extending from the base plate second surface, the anchoring component being releasably attachable to the mounting surface.

Preferably, the first retaining leg defines a first guiding segment extending from the first spacing arm to the first overlapping segment, the first guiding segment being configured and sized for slidably guiding the strip of optical fiber in the insertion slot. Conveniently, the first guiding segment is angled relative to the insertion slot longitudinal axis and intercepts the latter.

Preferably, the first and second retaining legs respectively define a first and a second guiding segment extending respectively from the first spacing arm to the first overlapping segment and from the second spacing arm to the second overlapping segment, the first and second guiding segments being configured and sized for slidably guiding the strip of optical fiber in the insertion slot.

Conveniently, the first and second guiding segments are both angled relative to the insertion slot longitudinal axis and both intercept the latter. Preferably, the first and second retaining legs are generally similar in configuration, the first and second retaining legs being configured, sized and positioned so that the first and second retaining leg second ends are substantially in register respectively with a first intersection between the first overlapping and guiding segments and a second intersection between the second overlapping and guiding segments.

Conveniently, the inner surfaces of the first and second retaining and spacing legs, the intersection between the first and second spacing legs and the first and second retaining legs and the base plate and the base plate second surface are all provided with a generally rounded contour.

In accordance with the present invention, there is also provided a retaining clip for retaining a strip of optical fiber defining a minimum bend radius, the clip being mountable on a mounting surface, the clip comprising: a mounting means for mounting the clip to the mounting surface, the mounting means including a base plate extending between the first and second spacing legs respectively adjacent the first and second spacing leg first ends, the base plate having a generally semi-oval transversal cross-sectional configuration defining a base plate first surface facing towards the retaining legs and an opposed base plate second surface, the base plate first surface having a generally flat configuration and the base plate second surface having a generally convex configuration; a first spacing leg and a second spacing leg, the first spacing leg defining a first spacing leg first end attached to the mounting means and an opposed first spacing leg second end, the second spacing leg defining a second spacing leg first end attached to the mounting means and an opposed second spacing leg second end; the first and second spacing legs both extending generally away form the mounting means, the first and second spacing leg first ends being spaced relationship relative to each other along a spacing leg spacing axis so as to define a spacing leg distance therebetween, the first and second spacing legs extending from the mounting means respectively along a first spacing leg axis and along a second spacing leg axis, the first and second spacing leg axes being both adapted to be in a substantially perpendicular relationship relative to the mounting surface when the clip is mounted on the mounting surface; a first retaining leg and a second retaining leg, the first retaining leg defining a first retaining leg first end attached to the first spacing leg and an opposed first retaining leg second end, the second retaining leg defining a second retaining leg first end attached to the second spacing leg and an opposed second retaining leg second end; the first and second retaining legs respectively defining a first and a second overlapping segment respectively extending generally inwardly beyond the second and first retaining leg second ends, the first and second overlapping segments being in a generally parallel and spaced relationship relative to each other so as to define an insertion slot therebetween, the insertion slot defining an insertion slot longitudinal axis extending in a generally parallel relationship relative to the spacing leg spacing axis, the first and second retaining legs being both positioned in a generally parallel relationship relative to the base plate, the first and second retaining legs respectively defining a first and second guiding segment extending respectively from the first spacing arms to the first overlapping segment and from the second spacing arm to the second overlapping segment, the first and second guiding segments being configured and sized for slidably guiding the strip of optical fiber in the insertion slot, the first and a second guiding segments being both angled relative to the insertion slot longitudinal axis and both intercepting the latter.

Preferably, the first and second spacing legs are sized so as to create a base-to-retaining leg spacing between the base plate second surface and the retaining legs, the base-to-retaining leg spacing being sized so as to allow a segment of the strip of optical fiber to bend while respecting the minimum bend radius from a direction substantially perpendicular to the first and second retaining leg axes wherein it abuttingly contacts the base plate second surface to a direction substantially parallel to the first and second retaining leg axes wherein it is inserted in the insertion slot.

In accordance with the present invention, there is further provided retaining clip for retaining a strip of optical fiber, the strip of optical fiber defining a minimum bend radius, the clip being mountable on a mounting surface, the clip comprising: a mounting means for mounting the clip to the mounting surface; a first spacing leg and a second spacing leg, the first spacing leg defining a first spacing leg first end attached to the mounting means and an opposed first spacing leg second end, the second spacing leg defining a second spacing leg first end attached to the mounting means and an opposed second spacing leg second end; the first and second spacing legs both extending generally away from the mounting means, the first and second spacing leg first ends being spaced relationship relative to each other along a spacing leg spacing axis, the first and second spacing legs extending form the mounting means respectively along a first spacing leg axis and along a second spacing leg axis, the first and second spacing leg axes being both adapted to be in a substantially perpendicular relationship relative to the mounting surface when the clip is mounted on the mounting surface; a first retaining leg and a second retaining leg, the first retaining leg defining a first retaining leg first end attached to the first spacing leg and an opposed first retaining leg second end, the second retaining leg defining a second retaining leg first end attached to the second spacing leg and an opposed second retaining leg second end; the first and second retaining legs respectively defining a first and a second overlapping segment respectively extending generally inwardly beyond the second and first retaining leg second ends, the first and second overlapping segments being in a generally parallel and spaced relationship relative to each other so as to define an insertion slot therebetween, the insertion slot defining an insertion slot longitudinal axis extending in a generally parallel relationship relative to the spacing leg spacing axis; the clip forming a generally inverted "U"-shaped configuration from a direction perpendicular to both the first and second spacing leg axes and the insertion slot axis, the inverted "U"-shaped configuration being adapted to cooperate with the mounting surface for forming an enclosure around the strip of optical fiber and preventing the removal thereof from the enclosure when the strip of optical fiber is oriented other then along a direction substantially parallel to the first and second spacing leg axes; the insertion slot being configured, sized and position so as to allow insertion and removal of the strip of optical fiber into and from the enclosure only when the strip of optical fiber is in a generally parallel relationship relative to the first and second spacing leg axes and aligned into the insertion slot.

Preferably, the clip is configured and sized so as to allow insertion of the strip of optical fiber in the insertion slot while respecting the minimum bend radius. Conveniently, the mounting means includes a base plate extending between the first and second legs respectively adjacent the first and second spacing leg first ends.

BRIEF DESCRIPTION OF THE DRAWINGS

An embodiment of the present invention will now be disclosed, by way of example, in reference to the following drawings in which.

DETAILED DESCRIPTION

Figure 1:
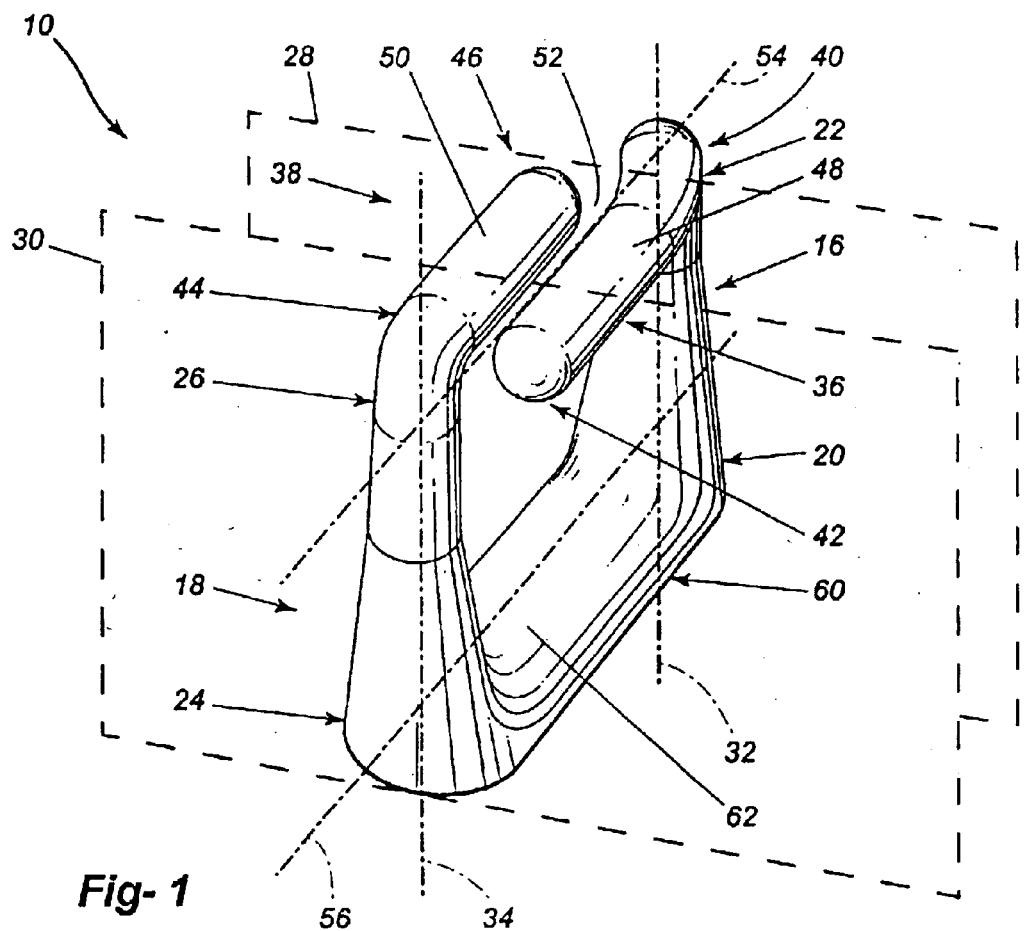
FIG. 1, in a perspective view, illustrates an optical fiber retaining clip in accordance with an embodiment of the present invention.

Referring to FIG. 1, there is shown in a perspective view, a retaining clip 10 in accordance with an embodiment of the present invention. As shown in FIGS. 2 through 4 and 6a through 6c, the retaining clip 10 is particularly well adapted to retain at least one and preferably a set of strips 12 of optical fiber. As shown more specifically in FIG. 5, the retaining clip 10 is preferably mountable on a mounting surface 14.

The retaining clip 10 includes a mounting means for mounting the retaining clip 10 to the mounting surface 14. The retaining clip 10 also includes a first spacing leg 16 and a second spacing leg 18. The first spacing leg 16 defines a first spacing leg first end 20 attached to the mounting means and an opposed first spacing leg second end 22. Similarly, the second spacing leg 18 defines a second spacing leg first end 24 attached to the mounting means and an opposed second spacing leg second end 26.

The first and second spacing legs 16, 18 both extend generally away from the mounting means respectively along a first spacing leg axis 32 and along a second spacing leg axis 34. Typically, the first and second spacing legs 16, 18 extend from the mounting means respectively in a first spacing leg geometrical plane 28 and in a second spacing leg geometrical plane 30. The first and second spacing leg geometrical planes 28, 30 are both adapted to be in a substantially perpendicular relationship relative to the mounting surface 14 when the retaining clip 10 is mounted on the mounting surface 14.

The first and second spacing legs 16, 18 may be angled relative to the mounting surface 14 as long as they remain in a geometrical plane substantially perpendicular to the latter. However, as is illustrated throughout the figures, the first and second spacing leg axis 32, 34 are preferably both adapted to be in a substantially perpendicular relationship relative to mounting surface 14 when the retaining clip 10 is mounted on the mounting surface 14. The first and second spacing leg first ends 20, 24 are also preferably spaced relative to each other along a spacing leg axis 56 so as to define a spacing leg distance 58 therebetween.

The retaining clip 10 also includes a first retaining leg 36 and a second retaining leg 38. The first retaining leg 36 defines a first retaining leg first end 40 attached to the first spacing leg 16 and an opposed first retaining leg second end 42. The second retaining leg 38 defines a second retaining leg first end 44 attached to the second spacing leg 18 and an opposed second retaining leg second end 46.

The first and second retaining legs 36, 38 respectively define first and second overlapping segments 48, 50 respectively extending generally inwardly beyond the second and first retaining leg second ends 46, 42. The first and second overlapping segments, 48, 50 are in a generally parallel and spaced relationship relative to each other so as to define an insertion slot 52 therebetween. The insertion slot 52 defines an insertion slot longitudinal axis 54 extending in a generally parallel relationship relative to the spacing leg axis 56.

The mounting means typically include a base plate 60 extending between the first and second spacing legs 16, 18 respectively adjacent the first and second spacing leg first ends 20, 24. As shown more specifically in FIG. 4, the base plate 60 typically has a semi-oval transversal cross-sectional configuration defining a base plate first surface 62 facing towards the first and second retaining legs 36, 38 and an opposed base plate second surface 64. Typically, although by no means exclusively, the base plate first surface 62 has a generally convex configuration while the opposed base plate second surface 64 has a generally flat configuration.

Preferably, the first and second retaining legs 36, 38 are both positioned in a generally parallel relationship relative to the base plate 60. The first and second spacing legs 16, 18 are sized so as to create a base-to-retaining leg spacing 66 between the base plate first surface 62 and the first and second retaining legs 36, 38. As shown more specifically in FIGS. 6a through 6c and as will be hereinafter disclosed in greater detail, the base-to-retaining leg spacing 66 is sized so as to allow insertion of a segment of the strip 12 of optical fiber into the insertion slot 52 while respecting the minimum bend radius of the fiber.

More specifically, the base-to-retaining leg spacing 66 is sized so as to allow a strip 12 of optical fiber to bend about a bending radius 68 from a direction indicated by the reference numeral 70 substantially perpendicular to a geometrical plane containing both the first and second spacing leg axes 32, 34 wherein it abuttingly contacts the base plate first surface 62 to a direction indicated by reference numeral 72 substantially parallel to a geometrical plane containing both the first and second spacing leg axes 32, 34 wherein it is inserted in the insertion slot 52. The base-to-retaining leg spacing 66 is sized so as to allow bending of the strip 12 of optical fiber about the bending radius 68 while the bending radius 68 is at least equal to the minimum bend radius of the fiber.

The first and second retaining legs 36, 38 are configured, sized and positioned so that the insertion slot longitudinal axis 54 preferably intercepts both the first and second spacing leg axes 32, 34. Also, the first and second retaining legs 36, 38 are preferably positioned so as to be in a generally parallel relationship relative to the mounting surface 14 when the retaining clip 10 is mounted on the mounting surface 14.

The first and second retaining legs 36, 38 preferably respectively define a first and a second guiding segment 74, 76 extending respectively from the first spacing leg 16 to the first overlapping segment 48 and from the second spacing leg 18 to the second overlapping segment 50. The first and second guiding segments 74, 76 are configured and sized for slidably guiding the strip 12 of optical fiber into the insertion slot 52.

Preferably, the first and second guiding segments 74, 76 are both angled relative to the insertion slot longitudinal axis 54 and both intercept the latter. Preferably, the first and second retaining legs 36, 38 are generally similar in configuration. The first and second retaining legs 36, 38 are configured, sized and positioned so that the first and second retaining leg second ends 42, 46 are substantially in register respectively with a first intersection 78 between the first overlapping and guiding segments 48, 74 and a second intersection 80 between the second overlapping and guiding segments 50, 76.

The mounting means may include any suitable means for mounting the base plate second surface 64 to the mounting surface 14 such as an adhesive, weld lines an integral molding or the like. In the embodiment of the invention shown in FIG. 5, the mounting means also includes an anchoring component 82 extending from the base plate second surface 64. The anchoring component 82 is typically releasably attachable to the mounting surface 14.

Figure 5:
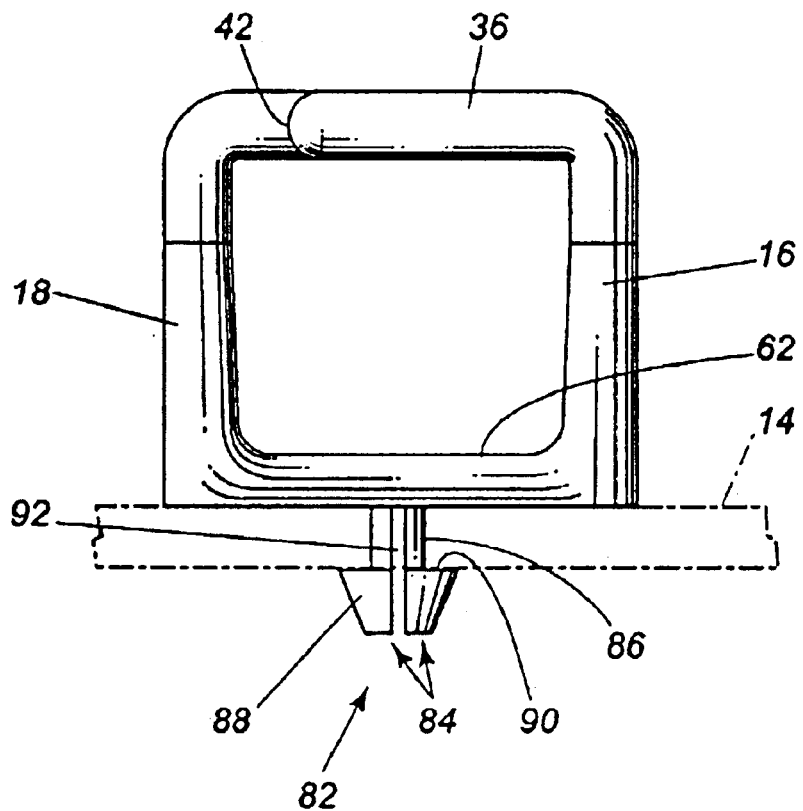
FIG. 5, in an elevational view, illustrates another embodiment of an optical fiber retaining clip in accordance with the present invention, the embodiment having a mounting pin extending therefrom, the optical fiber retaining clip being shown mounted to a mounting surface, the mounting surface being shown in phantom lines.

In the embodiment shown in FIG. 5, the anchoring component 82 includes an anchoring pin defining a pair of pin segments 84 having a corresponding pair of pin stems 86 and pin protrusions 88 defining a pair of pin rims 90 separated by a pin spacing 92. The pin segments 84 are configured, sized and positioned so that the pin rims 90 abuttingly contact the undersurface of the mounting plate defining the mounting surface 14.

Preferably, the inner surfaces of the first and second retaining and spacing legs 36, 38 and 16, 18, intersections 94 between the first and second spacing legs 16, 18 and the first and second retaining legs 36, 38, intersections 96 between the first and second spacing legs 16, 18 and the base plate 60 and the base plate first surface 62 are all provided with a generally rounded contour. Also preferably, the first and second retaining leg second ends 42, 46 are provided with a generally rounded contour.

Typically, although by no means exclusively, first and second guiding segments 74, 76 extend over a distance substantially in the range of one third the length of the first and second overlapping segments 48, 50. Also preferably, although by no means exclusively, the first and second guiding segments 74, 76 are angled by an angle having a value substantially in the range of 45 degrees relative to the insertion slot longitudinal axis 54.

Figures 2, 4:
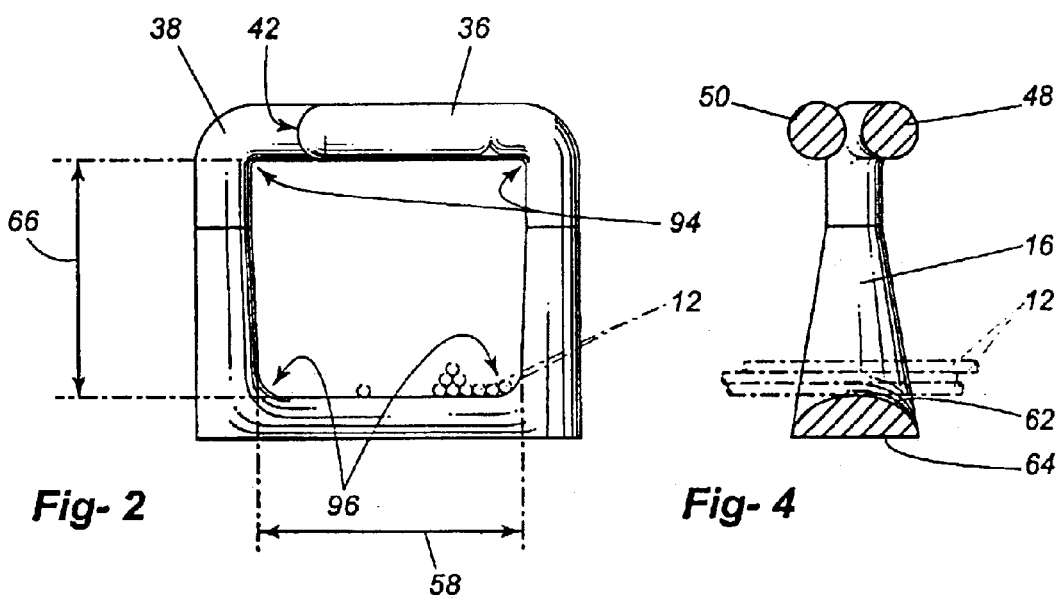
FIG. 2, in an elevational view, illustrates the optical fiber retaining clip shown in FIG. 1, the retaining clip being shown with optical fiber strips retained therein, the optical fiber strips being shown in phantom lines.
FIG. 4, in a transversal cross-sectional view taken along arrows 4—4 of FIG. 3, illustrates the optical fiber retaining clip shown in FIGS. 2 and 3 with strips of optical fiber mounted therein, the optical fiber strips being shown in phantom lines.
Figure 3:
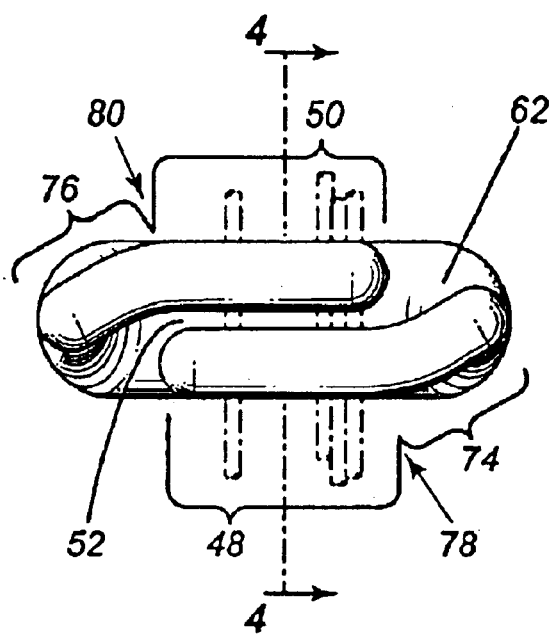
FIG. 3, in a top view, illustrates the optical fiber retaining clip and strips of optical fiber shown in FIG. 2, the optical fiber strips being shown in phantom lines.

As shown more specifically in FIGS. 2 and 5, the retaining clip 10 thus forms a generally inverted U-shaped configuration from a direction perpendicular to both the first and second spacing leg axes 32, 34 and the insertion axis 54. The inverted U-shaped configuration is adapted to cooperate with the mounting surface 14 or with the base plate 60 when the latter is present for forming an enclosure around the strip 12 of optical fiber and preventing the removal thereof from the enclosure when the strip 12 of optical fiber is oriented in a direction other than along a direction substantially parallel to the first and second spacing leg axes 32, 34.

Figure 6C:
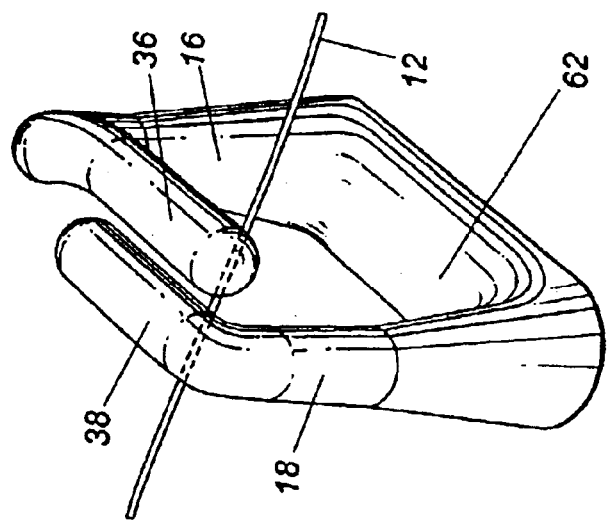
FIG. 6c, in a perspective view, illustrates the strip of optical fiber shown on FIGS. 6a and 6b retained within the retaining structure formed by the optical fiber retaining clip in accordance with the present invention.
Figure 6B:
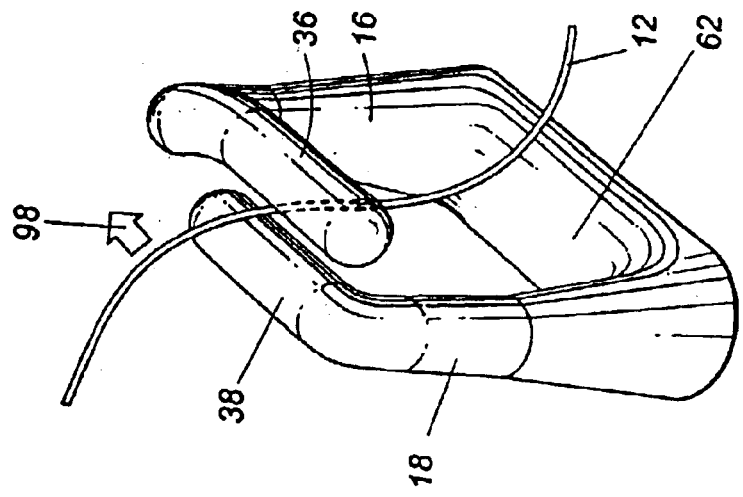
FIG. 6*b*, in a perspective view, illustrates the strip of optical fiber shown in FIG. 6*a* sliding in the insertion slot.
Figure 6A:
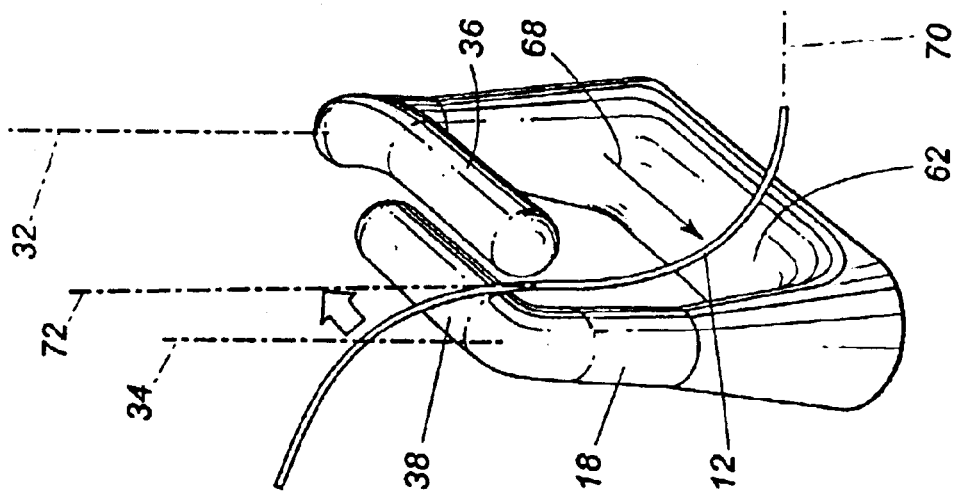
FIG. 6*a*, in a perspective view, illustrates a strip of optical fiber about to be inserted in an insertion slot part of an optical fiber retaining clip in accordance with an embodiment of the present invention.

As shown in FIGS. 6a through 6c, the insertion slot 52 is configured, sized and positioned so as to allow the insertion and removal of a strip 12 of optical fiber into and from the enclosure only when the strip 12 of optical fiber is in a generally parallel relationship relative to the first and second spacing leg axes 32, 34 and aligned with the insertion slot 52.

In use, the retaining clip 10 is adapted to be first mounted to a suitable mounting surface such as the mounting surface 14 using suitable mounting means such as the anchoring component 82 or any other suitable mounting means. As shown in FIG. 6a, a strip 12 of optical fiber is inserted within the enclosure formed by the retaining clip 10 by first positioning a segment of the strip 12 of optical fiber along a direction substantially parallel to the first and second spacing leg axes 32, 34.

The fiber segment is then aligned and guided by the first and second guiding segments 74 or 76 into the insertion slot 52 and slid thereinto as indicated by arrow 98 in FIG. 6b. Once the strip 12 of optical fiber has cleared the first or second retaining leg second end 42 or 46, the strip 12 of optical fiber may be allowed to bend back to its original substantially rectilinear configuration wherein it lies in a generally perpendicular relationship relative to both the first and second spacing leg axes 32, 34 and the insertion slot longitudinal axis 54.

In such a configuration, the strip 12 of optical fiber is not likely to unwillingly slip out of the retaining clip 10 since it would need to be bent to a configuration that allowed its insertion thereinto.

In other words, the orientation of the insertion slot longitudinal axis 54 greatly reduces the risks of having the strips 12 of optical fiber slip out of the retaining clip 10. Furthermore, the base-to-retaining leg spacing 66 allows the strip 12 of optical fiber 12 to be bent according to the bent configuration shown in FIGS. 6a and 6b while respecting the minimum bend radius of the strip 12 of optical fiber.

Furthermore, the generally rounded contour of the various clip segments with which the strip 12 of optical fiber may abuttingly contact are given a generally rounded contour so as to reduce the risk of inducing local stresses into the strip of optical fiber 12. The strip 12 of optical fiber may thus be easily inserted and removed into and from the retaining clip 10 through a set of ergonomic steps while respecting the minimum bend radius of the fiber. Once inserted in the retaining clip 10, it is retained by the latter with reduced risks of having the strip 12 of optical fiber slip out of the retaining clip 10 or having the strip 12 of optical fiber being subjected to undue local stresses.

What is claimed is:

1. A retaining clip for retaining a strip of optical fiber, said strip of optical fiber defining a minimum bend radius, said clip being mountable on a mounting surface, said clip comprising:

a mounting means for mounting said clip to said mounting surface;

a first spacing leg and a second spacing leg, said first spacing leg defining a first spacing leg first end attached to said mounting means and an opposed first spacing leg second end, said second spacing leg defining a second spacing leg first end attached to said mounting means and an opposed second spacing leg second end; said first and second spacing legs both extending generally away from said mounting means, said first and second spacing leg first ends being spaced relationship relative to each other along a spacing leg spacing axis so as to define a spacing leg distance therebetween;

a first retaining leg and a second retaining leg, said first retaining leg defining a first retaining leg first end attached to said first spacing leg and an opposed first retaining leg second end, said second retaining leg defining a second retaining leg first end attached to said second spacing leg and an opposed second retaining leg second end; said first and second retaining legs respectively defining a first and a second overlapping segment respectively extending generally inwardly beyond said second and first retaining leg second ends, said first and second overlapping segments being in a generally parallel and spaced relationship relative to each other so as to define an insertion slot therebetween, said insertion slot defining an insertion slot longitudinal axis extending in a generally parallel relationship relative to said spacing leg spacing axis.

2. A retaining clip as recited in claim 1 wherein said mounting means includes a base plate extending said first and second spacing legs respectively adjacent said first and second spacing leg first ends.

3. A retaining clip as recited in claim 2 wherein said base plate has a generally semi-oval transversal cross-sectional configuration defining a base plate first surface facing towards said first and second retaining legs and an opposed base plate second surface, said base plate first surface having a generally convex configuration and said base plate second surface having a generally flat configuration.

4. A retaining clip as recited in claim 3 wherein inner surfaces of said first and second retaining legs and of said first and second spacing legs, as well as intersections between said first and second spacing legs and said first and second retaining legs respectively, and intersections between said first and second spacing legs and said base plate, and said base plate first surface, are all provided with a generally rounded contour.

5. A retaining clip as recited in claim 2 wherein said first and second retaining legs are both positioned in a generally parallel relationship relative to said base plate, said first and second spacing legs being sized so as to create a base-to-retaining leg spacing between said base plate first surface and said first and second retaining legs, said base-to-retaining leg spacing being sized so as to allow a segment of said strip of optical fiber to bend while respecting said minimum bend radius from a direction substantially perpendicular to said first and second retaining leg axes wherein it abuttingly contacts said base plate second surface to a direction substantially parallel to said first and second spacing leg axes wherein it is inserted in said insertion slot.

6. A retaining clip as recited in claim 2 wherein said mounting means also includes an anchoring component extending from said base plate second surface, said anchoring component being releasably attachable to said mounting surface.

7. A retaining clip as recited in claim 1 wherein said first and second spacing legs extend from said mounting means respectively along a first spacing leg axis and along a second spacing leg axis, said first and second spacing leg axes being both adapted to be in a substantially perpendicular relationship relative to said mounting surface when said clip is mounted on said mounting surface.

8. A retaining clip as recited in claim 7 wherein said first and second retaining legs are configured, sized and positioned so that said insertion slot longitudinal axis intercepts both said first and second spacing leg axes.

9. A retaining clip as recited in claim 7 wherein said first and second retaining legs are positioned so as to be in a generally parallel relationship relative to said mounting surface when said clip is mounted on said mounting surface, said retaining legs being sized such that when said clip is mounted to said mounting surface.

10. A retaining clip as recited in claim 1 wherein said first and second retaining legs respectively define a first and a second guiding segment extending respectively from said first spacing arm to said first overlapping segment and from said second spacing arm to said second overlapping segment, said first and second guiding segments being configured and sized for slidably guiding said strip of optical fiber in said insertion slot.

11. A retaining clip as recited in claim 10 wherein said first and a second guiding segments are both angled relative to said insertion slot longitudinal axis and both intercept the latter.

12. A retaining clip as recited in claim 11 wherein said first and second retaining legs are generally similar in configuration, said first and second retaining legs being configured, sized and positioned so that said first and second retaining leg second ends are substantially in register respectively with a first intersection between said first overlapping and guiding segments and a second intersection between said second overlapping and guiding segments.

13. A retaining clip as recited in claim 1 wherein said first retaining leg defines a first guiding segment extending from said first spacing arm to said first overlapping segment, said first guiding segment being configured and sized for slidably guiding said strip of optical fiber in said insertion slot.

14. A retaining clip as recited in claim 13 wherein said first guiding segment is angled relative to said insertion slot longitudinal axis and intercepts the latter.

15. A retaining clip as recited in claim 1 wherein said first and second spacing legs extend from said mounting means respectively in a first spacing leg geometrical plane and in a second spacing leg geometrical plane, said first and second spacing leg geometrical planes being both adapted to be in a substantially perpendicular relationship relative to said mounting surface when said clip is mounted on said mounting surface.

16. A retaining clip for retaining a strip of optical fiber defining a minimum bend radius, said clip being mountable on a mounting surface, said clip comprising:

a mounting means for mounting said clip to said mounting surface, said mounting means including a base plate extending between said first and second spacing legs respectively adjacent said first and second spacing leg first ends, said base plate having a generally semi-oval transversal cross-sectional configuration defining a base plate first surface facing towards said retaining legs and an opposed base plate second surface, said base plate first surface having a generally flat configuration and said base plate second surface having a generally convex configuration;

a first spacing leg and a second spacing leg, said first spacing leg defining a first spacing leg first end attached to said mounting means and an opposed first spacing leg second end, said second spacing leg defining a second spacing leg first end attached to said mounting means and an opposed second spacing leg second end; said first and second spacing legs both extending generally away form said mounting means, said first and second spacing leg first ends being spaced relationship relative to each other along a spacing leg spacing axis so as to define a spacing leg distance therebetween, said first and second spacing legs extending from said mounting means respectively along a first spacing leg axis and along a second spacing leg axis, said first and second spacing leg axes being both adapted to be in a substantially perpendicular relationship relative to said mounting surface when said clip is mounted on said mounting surface;

a first retaining leg and a second retaining leg, said first retaining leg defining a first retaining leg first end attached to said first spacing leg and an opposed first retaining leg second end, said second retaining leg defining a second retaining leg first end attached to said second spacing leg and an opposed second retaining leg second end; said first and second retaining legs respectively defining a first and a second overlapping segment respectively extending generally inwardly beyond said second and first retaining leg second ends, said first and second overlapping segments being in a generally parallel and spaced relationship relative to each other so as to define an insertion slot therebetween, said insertion slot defining an insertion slot longitudinal axis extending in a generally parallel relationship relative to said spacing leg spacing axis, said first and second retaining legs being both positioned in a generally parallel relationship relative to said base plate, said first and second retaining legs respectively defining a first and second guiding segment extending respectively from said first spacing arms to said first overlapping segment and from said second spacing arm to said second overlapping segment, said first and second guiding segments being configured and sized for slidably guiding said strip of optical fiber in said insertion slot, said first and a second guiding segments being both angled relative to said insertion slot longitudinal axis and both intercepting the latter.

17. A retaining clip as recited in claim 16 wherein said first and second spacing legs are sized so as to create a base-to-retaining leg spacing between said base plate second surface and said retaining legs, said base-to-retaining leg spacing being sized so as to allow a segment of said strip of optical fiber to bend while respecting said minimum bend radius from a direction substantially perpendicular to said first and second retaining leg axes wherein it abuttingly contacts said base plate second surface to a direction substantially parallel to said first and second retaining leg axes wherein it is inserted in said insertion slot.

18. A retaining clip for retaining a strip of optical fiber, said strip of optical fiber defining a minimum bend radius, said clip being mountable on a mounting surface, said clip comprising:

a mounting means for mounting said clip to said mounting surface;

a first spacing leg and a second spacing leg, said first spacing leg defining a first spacing leg first end attached to said mounting means and an opposed first spacing leg second end, said second spacing leg defining a second spacing leg first end attached to said mounting means and an opposed second spacing leg second end; said first and second spacing legs both extending generally away from said mounting means, said first and second spacing leg first ends being spaced relationship relative to each other along a spacing leg spacing axis, said first and second spacing legs extending form said mounting means respectively along a first spacing leg axis and along a second spacing leg axis, said first and second spacing leg axes being both adapted to be in a substantially perpendicular relationship relative to said mounting surface when said clip is mounted on said mounting surface;

a first retaining leg and a second retaining leg, said first retaining leg defining a first retaining leg first end attached to said first spacing leg and an opposed first retaining leg second end, said second retaining leg defining a second retaining leg first end attached to said second spacing leg and an opposed second retaining leg second end; said first and second retaining legs respectively defining a first and a second overlapping segment respectively extending generally inwardly beyond said second and first retaining leg second ends, said first and second overlapping segments being in a generally parallel and spaced relationship relative to each other so as to define an insertion slot therebetween, said insertion slot defining an insertion slot longitudinal axis extending in a generally parallel relationship relative to said spacing leg spacing axis;

said clip forming a generally inverted "U"-shaped configuration from a direction perpendicular to both said first and second spacing leg axes and said insertion slot axis, the inverted "U"-shaped configuration being adapted to cooperate with said mounting surface for forming an enclosure around said strip of optical fiber and preventing the removal thereof from said enclosure when said strip of optical fiber is oriented other then along a direction substantially parallel to said first and second spacing leg axes;

said insertion slot being configured, sized and position so as to allow insertion and removal of said strip of optical fiber into and from said enclosure only when said strip of optical fiber is in a generally parallel relationship relative to said first and second spacing leg axes and aligned into said insertion slot.

19. A retaining clip as recited in claim 18 wherein said clip is configured and sized so as to allow insertion of said strip of optical fiber in said insertion slot while respecting said minimum bend radius.

20. A retaining clip as recited in claim 19 wherein said mounting means includes a base plate extending between said first and second legs respectively adjacent said first and second spacing leg first ends.

* * * * *